Oct. 31, 1939.  R. S. McKEEVER  2,178,178

SAFETY HEAD

Filed Nov. 8, 1937

Inventor:
R. S. McKeever
By Barry & Cyr
Attys.

Patented Oct. 31, 1939

2,178,178

UNITED STATES PATENT OFFICE 2,178,178

SAFETY HEAD

Roy S. McKeever, Tulsa, Okla., assignor, by mesne assignments, to The Parkersburg Rig & Reel Company, Parkersburg, W. Va., a corporation of West Virginia Application November 8, 1937, Serial No. 173,478

5 Claims. (Cl. 220—89)

This invention relates to safety devices to eliminate the hazards of pressure explosions.

The primary purpose of the invention is to provide a safety head designed especially for use with oil and gas separators (although not confined to this use), and which includes a frangible diaphragm adapted to burst wide and vent a pressure fluid, in the event of excessive pressure.

Another object is to supply a device of this character comprising clamping rings of special structure, at least one of which has a groove or the like to receive the edge of the diaphragm so that the latter will be firmly anchored in place when the clamping rings are drawn together by bolts or the like.

A still further object is to supply a safety device of simple and inexpensive construction and comprising means for firmly securing the diaphragm in place whereby in the event of rupture, a dome-shape portion of the diaphragm will split to instantly relieve the excess pressure without liability of the peripheral portion of the diaphragm being pulled away from the clamping means.

Another object is to provide a safety head for oil or gas separators or the like, comprising clamping rings, at least one of which has a parti-spherical clamping face designed to effectively clamp the peripheral portion of the diaphragm in position, due to the resiliency of the metal of the clamping ring, when the latter is drawn toward a base ring or the like.

A further object is to supply a safety head, the elements of which are of simple, inexpensive and durable construction, and the diaphragm of which is so shaped that its dome portion will readily split at various points upon the application of excess pressure without any danger of the peripheral portion of the diaphragm being pulled out from between the clamping rings or the like.

With the foregoing objects outlined and with other objects in view which will appear as the description proceeds, the invention consists in the novel features hereinafter described in detail, illustrated in the accompanying drawing, and more particularly pointed out in the appended claims.

Figure 1:
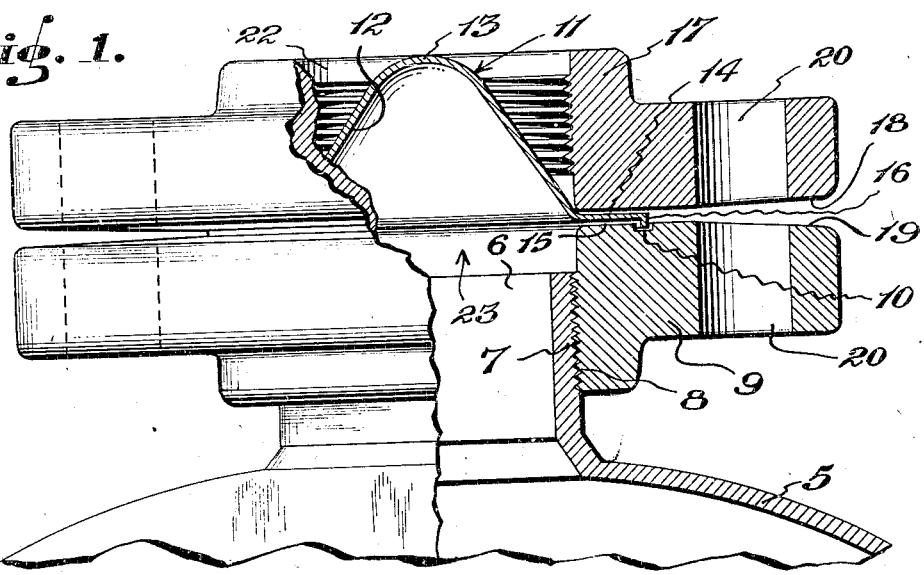
Fig. 1 is an elevation partly in vertical section of my improved safety head shown attached to the head portion of an oil and gas separator, and shown with the attaching bolts removed.

Referring to the drawing, 5 designates the head of an oil and gas separator to which the safety device is attached, but it will be understood that the device may be used in any environment where excess pressure may cause an explosion.

As exemplified, the head of the separator has an upstanding neck 6 provided with external screw threads 7 to engage the internal screw threads 8 of a base ring 9 which preferably has an annular groove 10 in its upper surface.

A metallic frangible diaphragm 11 preferably consisting of a cone shaped dome 12 having a parti-spherical peak 13, and a substantially flat peripheral flange or clamping portion 14, seats on the inner portion 15 of the upper surface of the base ring 9, and such diaphragm also has a down-turned annular flange 16 seated in the groove 10.

Such diaphragm is removably held in place by a clamping ring 17 which may be identical with the base ring 9 to facilitate manufacture, and as shown in Fig. 1 the opposed faces 18 and 19 of the rings are of parti-spherical form, whereby when the rings are drawn toward one another, they will tightly grip the marginal portion of the diaphragm due to the resiliency of the metal from which the rings are formed. Any suitable means may be employed to draw the rings together. For example, the rings may be provided with aligned bolt holes 20 to receive bolts, one of which is shown at 21 in Fig. 3.

With such a structure it will be recognized that the circular marginal portion of the diaphragm will not only be held in position by the clamping action brought about by drawing the rings together, but the upper ring will have a tendency to crowd the lip 16 of the diaphragm into the groove 10 to prevent any tendency of the marginal portion of the diaphragm to move toward the opening formed by the aligned ports 22 and 23 of the rings.

Figure 2:
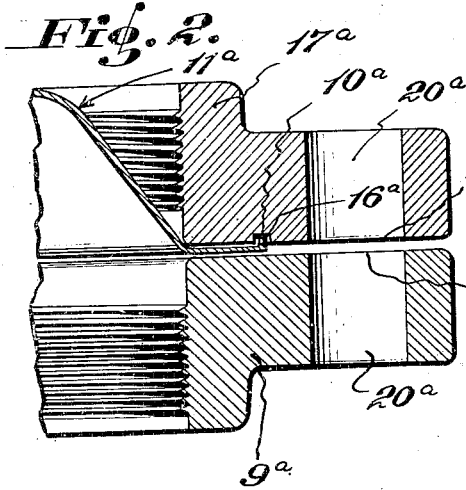
Fig. 2 is a fragmentary radial sectional view of a modification also with the bolts removed.
Figure 3:
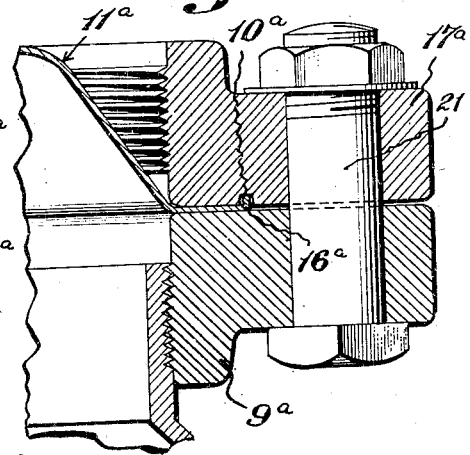
Fig. 3 is a similar view of said modification with the bolts attached.
Figure 4:
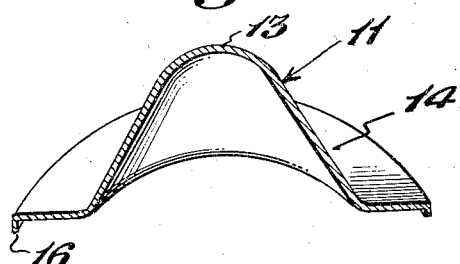
Fig. 4 is a perspective view of one half of one form of the diaphragm.

In the modification shown in Figs. 2 and 3, the groove 10a is shown at the bottom of the clamping ring 17a rather than in the upper surface of the base ring 9a; and the annular lip 16a of the diaphragm 11a is shown as up-turned rather than depending. Here also the opposing surfaces 18a and 19a of the rings may be made flat and parallel and the rings may be provided with aligned openings 20a to receive the bolts 21.

In this form of the invention, it is manifest that when the bolts are tightened the rings will clamp the marginal portion of the diaphragm and also provide an effective interlock between the lip 16a and the groove 10a.

Instead of employing both rings of the type shown in Fig. 1, I may use a base ring like 9a (Figs. 2 and 3) and a clamping ring of the type shown at 17 in Fig. 1 or I may use a base ring as shown at 9 in Fig. 1 and a clamping ring 17a of the type shown in Figs. 2 and 3. In any event at least one of the clamping rings will have an annular groove to receive the lip at the edge of the diaphragm.

It is evident that when the bolts are removed a diaphragm may be supplied or a ruptured diaphragm may be removed.

Many modifications of the invention will be apparent to those skilled in the art without departing from the invention or from the scope of the claims, and since the foregoing disclosure has been given by way of example for clearness and understanding, no unnecessary limitations should be understood and the appended claims should be construed as broadly as the state of the art permits.

What I claim and desire to secure by Letters Patent is:

1. A safety device of the character described comprising a plurality of opposed rings, one of said rings being provided with an annular groove, a frangible diaphragm having a central dome-shaped portion and a marginal portion terminating in an annular lip arranged substantially at an angle to the marginal portion, the dome-shape portion of the diaphragm being arranged substantially within one of the rings, the marginal portion being positioned between the rings and clamped thereby, and the lip being interlocked with the groove in one ring and being engaged by and forced into the groove by the other ring, and means for drawing said rings toward one another whereby said marginal portion is clamped between the rings and the lip is forced into the groove.

2. A safety device of the character described comprising a plurality of opposed rings having confronting faces, the face of one of said rings being provided with an annular groove, a frangible diaphragm having a central dome-shaped portion and a substantially flat marginal portion terminating in a substantially cylindrical lip, the dome-shape portion of the diaphragm being arranged substantially within one of the rings, the marginal portion being positioned between the rings and clamped thereby, and the lip being interlocked with the groove in one ring and being engaged by and forced into the groove by the other ring, and means for drawing said rings toward one another whereby said marginal portion is clamped between the rings and the lip is forced into the groove.

3. A safety device of the character described comprising a plurality of opposed rings, one of said rings being provided with an annular groove, a frangible diaphragm having a central dome-shaped portion and a marginal portion terminating in an annular lip arranged substantially at an angle to the marginal portion, the dome-shape portion of the diaphragm being arranged substantially within one of the rings, the marginal portion being positioned between the rings and clamped thereby, and the lip being interlocked with the groove in one ring and being engaged by and forced into the groove by the other ring, and means for drawing said rings toward one another whereby said marginal portion is clamped between the rings and the lip is forced into the groove, one of said rings being formed of substantially resilient metal and having a parti-spherical surface bearing upon the marginal portion of the diaphragm and confronting the other ring.

4. A safety device of the character described comprising a plurality of opposed rings, one of said rings being provided with an annular groove, a frangible diaphragm having a central dome-shaped portion and a marginal portion terminating in an annular lip arranged substantially at an angle to the marginal portion, the dome-shape portion of the diaphragm being arranged substantially within one of the rings, the marginal portion being positioned between the rings and clamped thereby, and the lip being interlocked with the groove in one ring and being engaged by and forced into the groove by the other ring, and means for drawing said rings toward one another whereby said marginal portion is clamped between the rings and the lip is forced into the groove, said rings being formed of resilient metal and having parti-spherical opposed confronting surfaces bearing upon the marginal portion of the diaphragm.

5. A safety device of the character described comprising a plurality of opposed rings having bores, one of said rings being provided with an annular groove, a frangible diaphragm having a central substantially conical portion and a marginal portion terminating in an annular lip arranged substantially at an angle to the marginal portion, the substantially conical portion of the diaphragm being arranged substantially within one of the rings and having its outer surface spaced throughout the extent thereof away from the surface of the bore of the last mentioned ring, the marginal portion of the diaphragm being positioned between the rings and clamped thereby, and the lip being interlocked with the groove in one ring and being engaged by and forced into the groove by the other ring, and means for drawing the rings toward one another whereby said marginal portion is clamped between the rings and the lip is forced into the groove.

ROY S. McKEEVER.